United States Patent [19]

Winterberg

[11] 4,412,967
[45] Nov. 1, 1983

[54] MULTISTAGE HIGH VOLTAGE ACCELERATOR FOR INTENSE CHARGED PARTICLE BEAMS

[76] Inventor: Friedwardt M. Winterberg, P.O. Box 11661, Reno, Nev. 89510

[21] Appl. No.: 138,602

[22] Filed: Apr. 9, 1980

[51] Int. Cl.³ .............................................. G21B 1/02
[52] U.S. Cl. .................................. 376/106; 376/127; 313/359.1; 175/16; 89/1 A
[58] Field of Search ............... 376/105, 106, 127, 129, 376/130, 144, 139–141; 313/359.1, 363.1; 315/5, 111.31; 328/233; 89/1 A; 175/16; 299/14

[56] References Cited

U.S. PATENT DOCUMENTS

| | | | |
|---|---|---|---|
| 3,005,767 | 10/1961 | Boyer et al. | 376/139 |
| 3,489,943 | 1/1970 | Denholm | 315/5 |
| 3,527,977 | 9/1970 | Ruark | 376/127 |
| 3,556,600 | 1/1971 | Shoupp et al. | 175/16 |
| 3,718,367 | 2/1973 | Schumacher | 175/16 |
| 3,760,286 | 9/1973 | Kelly | 376/105 |
| 3,864,640 | 2/1975 | Bennett | 376/105 |
| 3,968,378 | 7/1976 | Roberts et al. | 376/105 |
| 4,172,008 | 10/1979 | Fleet | 376/127 |

FOREIGN PATENT DOCUMENTS

| | | | |
|---|---|---|---|
| 447118 | 12/1978 | U.S.S.R. | 328/233 |
| 550932 | 12/1978 | U.S.S.R. | 328/233 |

OTHER PUBLICATIONS

Z. Naturforsch 32a, (1977) pp. 840–843, Winterberg.
Particle Accelerators, 1979, vol. 10, pp. 1–30, Nation.
IEEE Trans–on Nuclear Science, No. NS–23, No. 5, pp. 1470–1477, 10/76, Harris et al.
J. of Applied Physics, vol. 47, No. 12, 12/76, pp. 5236–5241, Read et al.
J. Appl. Phys. 50(7), Jul. 1979, pp. 4524–4531, Johnson et al.
Proc. of the Electron and Laser Beam Symposium, 1979, "Megavolt Pulsed Electron Beam Techniques", Graybill et al., pp. 175–189.
Scientific American, vol. 240, No. 4, 4/79, pp. 54–65, Parmentola et al.
Physical Review Letters, 2/71, pp. 295–297, Yoshikawa.

Primary Examiner—Harvey E. Behrend

[57] ABSTRACT

The invention relates to a multistage high voltage accelerator which especially should be capable of producing intense ion-beams of many million Ampere and many million Volts. The proposed accelerator may reach beam voltages of $10^8$ [V] and beam currents of $10^7$ [A]. The accelerator consists of several axially arranged cylindrical high voltage vacuum insulated capacitors charged in parallel and which over triggered spark gap switches are discharged in series. The closing of the spark gap switches is done in such a manner that a magnetically selfinsulated high voltage pulse moves down the line composed by these capacitors. Super-ion-beams produced by this type of accelerator can exceed the limiting Alfvén current for light ions, typically $10^7$ [A], and at which beam pinching occurs. The beam pinching of these super-beams permits them to be precisely focused onto a target for the controlled release of thermonuclear energy. Other applications for such an accelerator include particle beam weapons and rock-drilling.

1 Claim, 2 Drawing Figures

MULTISTAGE HIGH VOLTAGE ACCELERATOR FOR INTENSE CHARGED PARTICLE BEAMS

BACKGROUND OF THE INVENTION

There are several devices to reach high voltages. In one of these devices, called Marx generator, a bank of capacitors is charged up in parallel and over spark gap switches discharged in series. If the initial voltage up to which the capacitors are charged is V and if there are n capacitors charged in parallel, then the final voltage, after the capacitors are switched in series, is nV. To transmit the thusly created high voltage pulse to some load, the concept of magnetic selfinsulation first proposed by the inventor, has been proved very useful. If applied to a coaxial vacuum transmission line one utilizes the fact that the large electric current produced by the pulse and moving down the line generates a strong magnetic field acting in a direction perpendicular to the large radial electric field going down the line with the pulse. Due to this strong self-magnetic field electrons are deflected by the vxH Lorentz-force and hence are unable to cross the gap. These two concepts, the first one which is the Marx generator and the second one which is the coaxial magnetically selfinsulated transmission line, are in the invention combined in a novel way. The Marx generator concept is used to produce very large voltages and the magnetic selfinsulation concept to sustain these large voltages within the Marx generator itself. This combination permits the attainment of much higher voltages and currents.

SUMMARY OF THE INVENTION

In the proposed invention the Marx generator consists of a number, say n, axially arranged cylindrical vacuum capacitors, all having a common outer return current conductor. The capacitors, after being charged up in parallel, are discharged in series over triggered circular spark gap switches in such a manner, that an electromagnetic wave of rising amplitude moves down the transmission line. This transmission line is here formed by the outer part of the capacitors and the common return current conductor. The strong magnetic field associated with the pulse will magnetically selfinsulate the line. At the end of the line is a diode from which a charged particle beam, consisting either of ions or electrons can be extracted. Because the expected final current can be very large and hence much larger than the Alfvén current for electrons, the proposed novel high voltage generator is especially useful for the generation of intense ion beams of very high voltage.

DETAILED DESCRIPTION OF INVENTION

Figure 1:
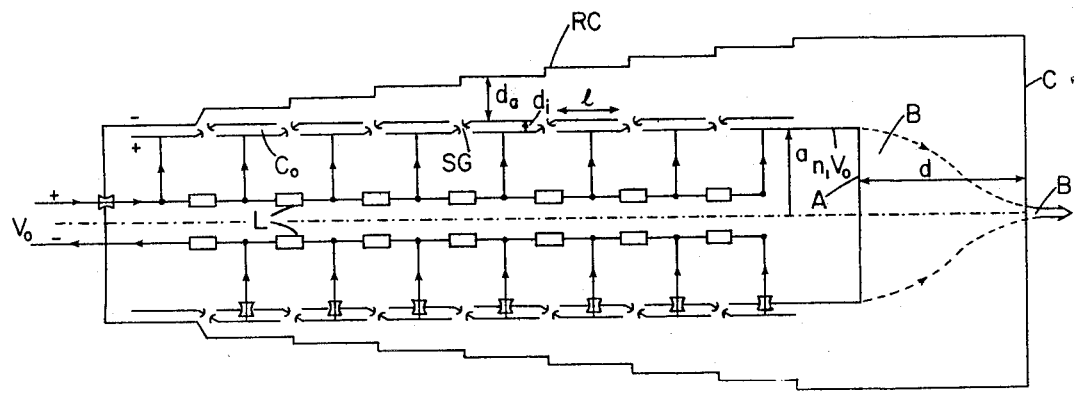
FIG. 1 shows a cross section through the pulsed high voltage accelerator. The high voltage is obtained by using a series of cylindrical capacitors arranged in a multistage transmission line. $V_o$ is the input voltage from a high voltage source, $C_o$ are cylindrical capacitors of length l and inner radius "a" and separation distance $d_i$, in between inner and outer conductors. SG are triggered circular spark gap switches, L are inductances, RC is a vacuum vessel also serving as the return current conductor and which is separated by the distance $d_a$ from the cylindrical capacitors, d is the diode gap, A the anode, C the cathode and B the ion beam.
Figure 2:
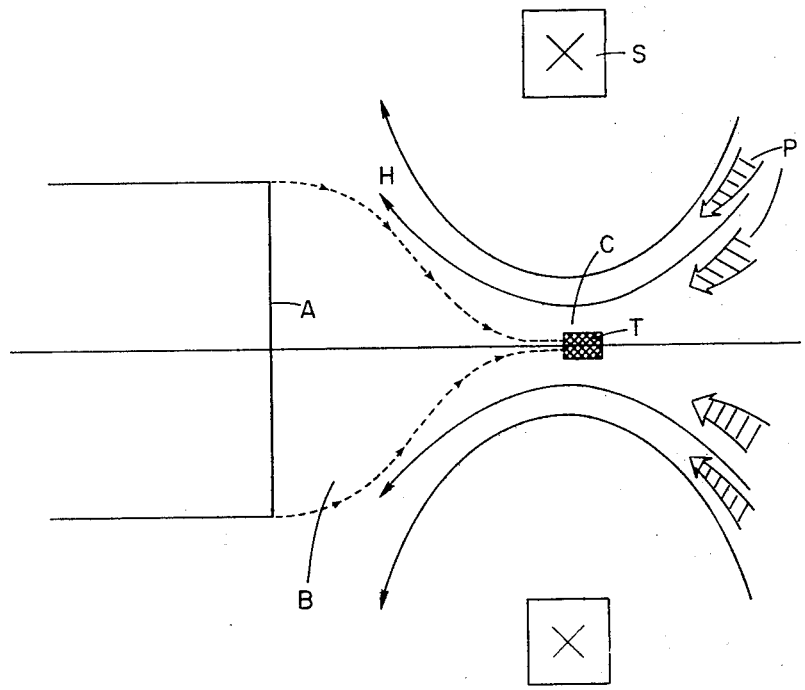
FIG. 2 shows how a plasma cathode in combination with a magnetic field can be used to achieve target bombardment in case the extracted beam is applied for the ignition of thermonuclear micro-explosions. A is the anode, C the plasma cathode, T the target, S the magnetic solenoid, B the ion beam and P the plasma jets injected along magnetic field lines H.

We propose here a concept by which very high voltages can be reached in stages using conductors and where breakdown can be prevented by magnetic self-insulation. Experimentally, magnetic self-insulation has been shown to work in low inductance high voltage transmission lines for fields up to several $10^7$ [V/cm][1]. To understand this effect in the simplest way, consider the case of a coaxial transmssion line. If the outer and inner radius of the transmission line conductors are b and a, the impedance (in electrostatic units) of the line is given by $$Z = \frac{2}{c} \ln\left(\frac{b}{a}\right) \qquad (1)$$

If the transmission line has a length l and an electric charge Q, the radial electric field between the two concentric conductors is given by $E = 2Q/lr$, and hence the voltage is $$V = \int_a^b E dr = \frac{2Q}{l} \ln\left(\frac{b}{a}\right) = cQZ/l \qquad (2)$$

Then, if the discharge time of the line is $\tau \simeq l/v$, where v is the drift velocity of the electric charges moving along its conductors, the current flowing down the line is given by $$I = \frac{Q}{\tau} \simeq \frac{Qv}{l}. \qquad (3)$$

Because $I = V/Z$ it follows from (2) and (3) that $v/c \simeq 1$. But since the drift velocity for the charges along the line is also given by $v = cE/H$, it follows that $H \simeq E$. From this result it is not immediately clear if the self-magnetic field is strong enough to insure magnetic insulation. Actually, if $E < H$ the electrons will always undergo a cycloidal motion in the axial direction, and magnetic insulation should be here satisfied as long as the cathode-anode gap is large enough to prevent the electrons from reaching the anode. If only an external magnetic field is applied, magnetic insulation requires[2] $E < 0.62H$, because an externally applied magnetic field is weakened by the induced diamagnetic currents in the electron cloud positioned above the cathode surface. This weakening effect, of course, does not occur under the circumstances of magnetic self-insulation. The fact that here $E \simeq H$ shows that magnetic self-insulation is only marginally satisfied. One reason why it works is that the duration of the high voltage pulse passing through the transmission line is very short. However, in order to insure magnetic insulation a second condition has to be simultaneously satisfied. This condition is that the electrons during their cycloidal drift motion have to be prevented from crossing the cathode-anode gap. The Larmor radius for an electron emitted from the cathode surface and accelerated towards the anode is for large $\gamma$-values approximately given by $$r_L \simeq \frac{\gamma mc^2}{eH}. \quad (4)$$

The $\gamma$-value is here a variable which can go from $\gamma=1$ to $\gamma mc^2 = eDd_a$, where $d_a$ is the cathode-anode gap. Because $\gamma$ is variable, and in case of relativistic electron energies much smaller near the cathode, the electron trajectory is a deformed cycloid with a larger radius of curvature near the cathode. As a result the cycloid will be flattened out as the electron approaches the anode, effectively confining the trajectory close to the cathode. This is a second reason why magnetic insulation works even in the marginal case $E \simeq H$ at relativistic electron energies. To analyze the effect of a variable $\gamma$-value we put into (4) an average $\gamma$-value $\overline{\gamma}$ resulting in an average value $\overline{r_L}$. Then, in order for the electron to be prevented from reaching the anode, one obviously must have $$\overline{r_L} < d_a, \quad (5)$$

with $$\overline{r_L} = \frac{\overline{\gamma} mc^2}{eH}. \quad (6)$$

Now, if we put $\epsilon = \gamma/\overline{\gamma} < 1$, with $eH \simeq eE$ and $\gamma mc^2 \simeq eEd_a$, one finds from (6) that $$\overline{r_L} = \epsilon d_a < d_a, \quad (7)$$

as required.

It thus follows that as long as the impedance of the transmission line is matched to the load, which for example is the case if the load is a beam producing diode at the end of the line, the second condition for magnetic self-insulation is satisfied.

We now show how this magnetic self-insulation effect can be used to get very high voltages by a series of cylindrical capacitors arranged in a multistage transmission line. The principle of the idea is explained in FIG. 1. A high voltage pulse $V_0$ of positive polarity, drawn for example, from a Marx generator, enters from the left into a long vacuum chamber RC and charges up in parallel $n_1$ cylindrical capacitors, each with capacitance $C_0$, and centered in RC. Except for the first capacitor for which the outer conductor is at the same time part of the outer return current conductor RC of the whole assembly, all other capacitors have an outer cylindrical conductor positioned in between the outer return conductor and the inner conductor. The charging voltage pulse may be as high as $10^7$ [V], as has been successfully demonstrated with Marx generators. After the capacitors have been charged up to the voltage $V_0$ they are discharged in series by the triggered circular spark gap switches SG in such a programmed way that the subsequent closing of the switches to the right proceeds with a phase velocity equal to the velocity of light. Furthermore, to prevent discharging through the central charging transmission lines, inductances L are placed into these lines as shown. This can be done by simply giving these transmission lines a relatively small cross section.

The closing of the switches in series is here exactly like in a Marx generator. Nevertheless, unlike in a Marx generator, the programmed closing of the switches propagates with a phase velocity equal to the velocity of light and leads to a growing electromagnetic wave moving down the transmission line formed by the outer return current conductor RC and the outer sides of the outer part of all the coaxial capacitors. Because this electromagnetic wave is growing in amplitude as it moves to the right, the distance of separation between the outer return current conductor RC and the outer conductors of the coaxial capacitors $C_0$ must become larger down the line. The reason for this is easily understood. Since each capacitor is assumed to have the same capacitance $C_0$ and is charged up to the same initial voltage $V_0$, each acquires the same charge $Q = C_0 V_0$. The discharge time of each capacitor, assumed to have a length l, is of the order $l/c$ and the current wave moving down the line therefore has a constant amplitude. But because $V = IZ$, the impedance Z of the coaxial transmission line must grow in proportion to V and in proportion to the number of capacitors closed in the line.

The impedance Z of this variable coaxial transmission line is approximately given by $$Z \simeq 60 \ln\left(\frac{b}{a}\right) [\Omega], \quad (8)$$

where b is the increasing outer radius of the transmission line, equal to the radius of the return current conductor, and a is equal to the radius of the outer conductor of all the cylindrical capacitors.

If $d_i$ is the distance of separation between the two conductors of each cylindrical capacitor, then, for $d_i << a$, with $b = a + d_i + d_a$, it follows that the impedance at the position of the $n^{th}$ capacitor, counted from the left, is $$Z_n \simeq 60 \frac{d_a}{a} [\Omega]. \quad (9)$$

The voltage at this position will be $V_n = nV_0$, and hence $$V_n = nV_0 = IZ_n \quad (10).$$

But because $$V_o = IZ_o \simeq 60 \frac{d_i}{a} I, \quad (11)$$

it follows that $$d_a \simeq nd_i \quad (12).$$

The gap $d_a$ must therefore increase in proportion to the number of capacitors which will be subsequently switched into series. Since the switching in series goes in a programmed way as the wave moves to the right, the gap $d_a$ must simply increase by one step in going from one to the next capacitor as shown in FIG. 1.

The increase in the wave amplitude as the wave moves to the right very much resembles a laser, except that the wave amplification effect is here completely classical and is performed by the programmed closing of the triggered spark gap switches.

Because the wave moves to the right with the velocity of light an axial breakdown along the line is impossible. Such a breakdown would always proceed with a velocity smaller than the velocity of light. Radial breakdown is prevented by magnetic selfinsulation as explained above.

After the wave has reached the end of the line the voltage has risen to $V_1 = n_1 V_0$, even though the current has remained constant. If, for example, $n_1 = 8$ and $V_0 = 10^7$ [V], one has $V_1 = 8 \times 10^7$ [V]. The linear dimensions of the capacitors determine the total current, the pulse duration, and hence the power delivered to the load. Let us assume, that each cylindrical capacitor has a length of $l = 3 \times 10^2$ [cm] and a radius of $a = 4 \times 10^2$ [cm]. Its discharge time is then given by $\tau = l/c = 10^{-8}$ [sec]. If the final voltage is $V_1 = 8 \times 10^7$ [V] and a total energy of $10^7$ Joule is delivered, the current must be $I = 10^7 / V_1 \tau$ [V] $= 1.25 \times 10^7$ [A]. This is approximately equal to the Alfvén current for protons or fully ionized helium ions. The value of $d_a$ in the last segment of the transmission line is determined by the requirement that $V = IZ$, using expression (9) for Z. One obtains $d_a \simeq 43$ [cm], and since $n = 8$, one has $d_i = 5.4$ [cm]. The impedance itself is $Z = 8 \, [\Omega]$.

REFERENCES (1) G. Yonas, Scientific American 239 50 (1978).
(2) F. Winterberg, Il Nuovo Cimento 20B 359 (1974).

I claim:

1. A method of achieving charged particle beams of at least $10^7$ volts using conductors in stages and wherein breakdown is prevented by magnetic self-insulation comprising:

concentrically arranging a plurality of axially alligned vacuum insulated identical cylindrical capacitors inside a conductive vessel and coaxial therewith, said vessel serving as a common return current conductor for said capacitors, said cylindrical capacitors being comprised of inner and outer cylindrical conductors wherein said vessel together with said axially alligned outer cylindrical conductors comprises a multi-stage transmission line, connecting said plurality of cylindrical capacitors in series by means of triggered spark gap switches;

placing a charged particle beam producing diode means at one end of said transmission line, said diode means serving to produce a charge particle beam of at least $10^7$ volts;

matching the impedance of said transmission line to that of said diode means such that electrons emitted from the cathode of said diode means are prevented from crossing the cathode—anode gap so as to insure magnetic self-insulation;

charging said cylindrical capacitors in parallel by means of a central axially arranged charging line which contains inductances between the connections of said central charging line to said capacitors, said inductances being sufficient to prevent discharging of the capacitors through said central charging line;

discharging said plurality of capacitors in series through said triggered spark gap switches, said discharge beginning at the end of said vessel opposite to said one end of said transmission line, said discharging taking place in a predetermined manner such that the closing of said switches proceeds with a phase velocity equal to the velocity of light and causes the formation of an electromagnetic wave which moves down said transmission line to the other end thereof in a predetermined time period with said electromagnetic wave growing in amplitude as it moves down said transmission line and producing a magnetic field, said predetermined time period being sufficiently short so as to ensure magnetic self-insulation, the spacing between said outer cylindrical conductors and said vessel increasing in the direction towards said one end of the transmission line in such a manner as to acccommodate said increase in amplitude;

applying said electromagnetic wave to said beam producing diode means to produce a charged particle beam.

* * * * *